July 24, 1962     H. E. SCHULTZE     3,046,001
COMBINATION SHOCK ABSORBER AND AIR SPRING Filed April 13, 1960

INVENTOR.
Harold E. Schultze
BY
His Attorney

United States Patent Office 3,046,001
Patented July 24, 1962

3,046,001
COMBINATION SHOCK ABSORBER
AND AIR SPRING
Harold E. Schultze, Dayton, Ohio, assignor to General Motors Corporation, Detroit, Mich., a corporation of Delaware
Filed Apr. 13, 1960, Ser. No. 22,006
4 Claims. (Cl. 267—64)

This invention relates to vehicle suspension systems using main springs between the sprung mass and the unsprung mass of the vehicle whereby the sprung mass is resiliently supported on the unsprung mass, the sprung mass comprising generally the chassis and body of the vehicle while the unsprung mass comprises generally the road engaging wheels and the axles for the vehicle. The main springs of the vehicle may be either of the leaf type or coil type or they may be air springs or torsion bars. However the main springs are controlled on their rebound movement as well as on their compressive movement by means of shock absorbers that are connected between the sprung mass and the unsprung mass of the vehicle, usually adjacent each of the main springs of the vehicle whereby each of the main springs is controlled by its respective shock absorber.

Each of the main springs for the vehicle is controlled by its respective shock absorber in a manner that on expansive movement of the spring, that is on rebound movement of the vehicle body away from the axle, the shock absorber damps or restricts the expansive movement of the spring so as to control the rebound movement of the body of the vehicle away from the axle; and on compressive movement of the spring, that is on movement of the body and the axle toward one another, the shock absorber, on its compression stroke, regulates the compressive movement of the spring and thereby the rate of movement of the axle and the body toward one another.

In the present day automobiles, the engineering of the suspension system, that is the main springs and the shock absorbers used in controlling the main springs for any particular size and weight of vehicle is somewhat of a compromise between the ideal suspension for a lightly loaded vehicle carrying a single passenger and a heavily loaded vehicle carrying five or six passengers together with a heavy load of baggage. If the suspension system were engineered solely for a lightly loaded vehicle, then the suspension system would be inadequate for supporting a heavily loaded vehicle. On the other hand if the suspension system is engineered to support the maximum load that might be expected to be carried by the vehicle, then the suspension system becomes quite rigid and results in harsh ride in the vehicle.

Thus it has been necessary to engineer the spring system for a particular vehicle as a compromise between the two extreme conditions of use of a vehicle, and this is particularly true in passenger vehicles and in station wagons that are in use today. This compromise type of engineering requirement results in a vehicle that rides more stiffly when lightly loaded and which is provided with somewhat inadequate suspension support when the vehicle is fully loaded to the extent that when the vehicle is fully loaded, the rubber bump stops that are provided on all vehicles between the frame and axle of the vehicle tend to engage the axle more frequently than should be necessary when the vehicle is fully loaded.

Furthermore, passenger automobiles, and particularly the station wagon type of automobile, are in use more and more to pull trailers, boats, and to carry much other heavy equipment for temporary periods of time. This overloads the suspension system balance and causes the rear end of the vehicle to sag excessively and in many cases cause the frame of the vehicle to ride on the axle by way of the bump stops. In addition, when the rear end of the vehicle is heavily loaded, the front end of the vehicle tends to be thrown up into the air so that the headlight beam of the vehicle is thrown into the air and into the vision of an oncoming vehicle, which tends to make for dangerous driving conditions.

This problem has been recognized in the automobile industry as evidenced by the fact that helper springs have been designed for use on vehicles for placement between the axle and the frame or chassis of the vehicle so as to give added spring effect to the main spring. However, these helper springs have generally been designed to work continuously with the main spring to increase its effect with the result that the vehicle produces an unpleasant ride when it is lightly loaded and in many instances the helper springs have materially raised the rear end of the vehicle when it is lightly loaded which adversely affects the headlight beam adjustment under these conditions.

In this invention an auxiliary air spring is carried by the shock absorber for each of the respective springs, if desired, but mainly used on the shock absorbers for the two rear springs of the vehicle. The air spring on the shock absorber is constructed and arranged in a manner that it will not produce any substantial change in the normally engineered spring suspension for a vehicle, but which air spring can be supplied with air under pressure, or any suitable gas under pressure, whenever a load above a normal load is to be carried by the vehicle so that the main spring of the vehicle will be aided during the period of abnormal load carrying by the vehicle to increase the load carrying capacity of the total suspension system and thereby prevent bottoming of the vehicle even though it is heavily loaded.

It is therefore an object of this invention to provide a suspension system which incorporates an auxiliary spring with a hydraulic shock absorber for connection between the sprung mass and the unsprung mass of the vehicle to add to the suspension effect of the main spring when air under pressure is supplied to the air spring and which will not in any substantial respect have any effect on the operation of the main spring when the air pressure is released from the air spring. In this manner the main spring of the suspension system can be engineered in the conventional manner without requiring special consideration with regard to the auxiliary spring that is incorporated with the shock absorber.

It is another object of this invention to provide an auxiliary unit composed of a shock absorber and an air spring carried thereon which is adapted to be mounted on a vehicle in the same place as the conventional shock absorbers so that the suspension system balance of the vehicle will not be altered to any substantial extent by incorporation of the auxiliary unit of this invention between the sprung mass and the unsprung mass of the vehicle in the same place as the conventional shock absorbers, the auxiliary unit of this invention allowing the conventional springs to function in their normal manner under any and all load conditions applied to the vehicle in the same manner as though the auxiliary air spring unit was not incorporated on the shock absorber, but which air spring unit can be supplied with air or other gas under pressure manually by the operator of the vehicle to offset any above normal load increase applied to the vehicle by way of extra number of passengers or baggage or boat trailer, etc., the air spring unit thereby maintaining a vehicle in a normal level condition, with the above normal load offset properly. Since the auxiliary air spring unit of this invention merely offsets the additional load applied to the vehicle, the ride characteristics of the vehicle will not be materially changed, and will be improved to the extent that the vehicle is prevented from the usual bottoming that results from an overloaded condition.

It is another object of the invention to provide an auxiliary unit composed of a shock absorber carrying an air spring in the manner heretofore described wherein the shock absorber and the air spring are constructed and arranged in a manner that the air pressure or gas pressure within the air spring causes the gas chamber in the reservoir of the shock absorber to become supercharged, or charged with gas pressure substantially above atmosphere, to insure more consistent operation of the shock absorber and reduce frothing of the oil in the shock absorber as a result of the increased air pressure in the air chamber applied to the oil in the body of the oil in the reservoir of the shock absorber.

It is another object of the invention to provide a direct acting tubular type shock absorber having relatively telescoping parts one of which comprises a piston rod that passes into a cylinder and reservoir tube assembly in which the reservoir tube surrounds the cylinder tube, the rod member having a tubular member that partially surrounds the reservoir tube for a part of its length to enclose the reservoir tube, this tubular member reciprocating with the rod member on its reciprocation relative to the reservoir and cylinder tube assembly, the shock absorber having a diaphragm tubularly arranged structure disposed in the space between the reservoir tube and the tubular member carried on the rod member with free ends of the tubularly arranged diaphragm member sealingly engaging or attached to the reservoir tube and to the tubular member carried by the rod member to form thereby a fluid receiving chamber in the space provided between the reservoir tube and the tubular member carried on the rod member which is capable of receiving gases under pressure to urge extension of the shock absorber parts and thereby resist compressive movement of the sprung mass of the vehicle relative to the unsprung mass and thereby aid the main suspension spring of the vehicle in supporting the load of the vehicle. The pressure fluid is adapted to be supplied into the fluid receiving chamber under manual control of the operator of the vehicle that the operator can regulate the value of the air pressure in the fluid receiving chamber to offset the increased load that has been added to the normal load of the vehicle.

While the foregoing objects of the invention can be accomplished by the application of the auxiliary unit of shock absorber and air spring to replace the conventional shock absorbers on vehicles that are already on the road, and on those vehicles wherein the auxiliary unit of this invention is not applied as original equipment at the time of manufacture, it is entirely within the purview of this invention that the auxiliary unit of this invention will permit engineering of a main suspension spring for a vehicle to be more resilient and of just sufficient strength to support the minimum load, such as a one passenger load in a vehicle and then to use the air spring of the auxiliary unit to aid the main spring of the vehicle in supporting any load more than one passenger load. Under this circumstance the main spring could be engineered to give the most comfortable ride under the light load condition of the vehicle and then utilize the air spring to support any heavier load by manually increasing the air pressure in accordance with the load in the vehicle so that the ride characteristics of the vehicle will remain substantially the same as under the light load conditions.

These and other objects of the invention will be apparent from the drawings on the following detail description.

In the drawings.

Figure 2:
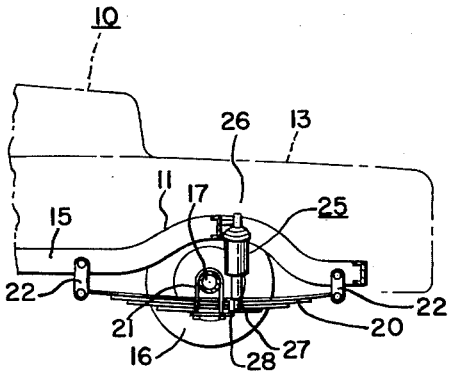
FIGURE 2 is a longitudinal view of a part of a vehicle illustrating the use of the auxiliary unit of this invention on the vehicle.
Figure 3:
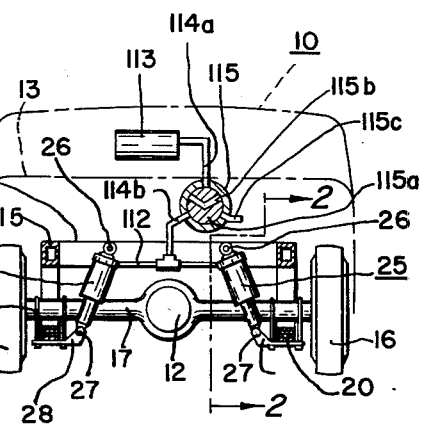
FIGURE 3 is a transverse view of a vehicle illustrating the use of the auxiliary unit of this invention between the sprung mass and the unsprung mass of the vehicle.

In FIGS. 2 and 3 of the drawings, the rear portion of an automotive vehicle 10 is illustrated, the vehicle being of the passenger type, although it will be understood that the invention is equally applicable to station wagons, trucks and other types of motor vehicles that have a sprung assembly supported upon an unsprung assembly. The automobile 10 includes a sprung assembly 11 and an unsprung assembly 12. The sprung assembly conventionally includes the body 13 supported on a chassis frame 15 and the other parts thereof that are conventionally associated with the body and the chassis frame as the sprung assembly. The unsprung assembly includes the ground engaging wheels 16 supported conventionally on the axle housing 17 and the other parts therewith normally associated with this unsprung assembly.

The sprung assembly is supported upon the unsprung assembly by means of leaf springs 20, the leaf spring 20 being secured on the axle housing 17 by a spring seat and the U-bolts 21. Opposite ends of the leaf spring assembly are secured to the chassis frame 15 by means of the shackle connections 22, whereby the chassis frame 15 is supported upon the axle housing 17. It will be appreciated that while the drawings illustrate a leaf-type spring as the main spring for suspending the sprung assembly on the unsprung assembly, other suitable and conventional types of springs can be used, such as coil springs, air springs, torsion bars, etc. without departing from the scope of this invention. Also, the auxiliary units 25, each consisting of a shock absorber and an air spring hereinafter more fully described, are illustrated as being used at the rear end of a vehicle. These units can also be used at the front of the vehicle without departing from the scope of the invention.

The auxiliary units 25 each has an attachment member 26 at one end thereof by which the unit 25 is attached to the chassis frame 15. Also, each of the auxiliary units 25 has an attachment member 27 by which the auxiliary units are attached to the unsprung assembly 12, and specifically by bracket members 28 that extend from the spring seats for the leaf springs 20. As shown in FIG. 3, the auxiliary units 25 are angled inwardly toward the longitudinal center line of the vehicle to provide for stability of the vehicle when traversing curves and corners.

Each of the auxiliary units 25 consists of a direct acting shock absorber 30 and an air spring 35, the air spring consisting of a double walled tubular structure closed at one end that is positioned within an annular space provided between the outer periphery of the reservoir tube of the shock absorber and a tubular member that encloses at least a part of the length of the reservoir tube of the shock absorber, the tubular wall structure including an inner and an outer wall portion of resiliently flexible material that are connected by a U-shaped wall portion of the same material that is formed from the inner and the outer wall portions as they reciprocate axially relative to one another.

Figure 1:
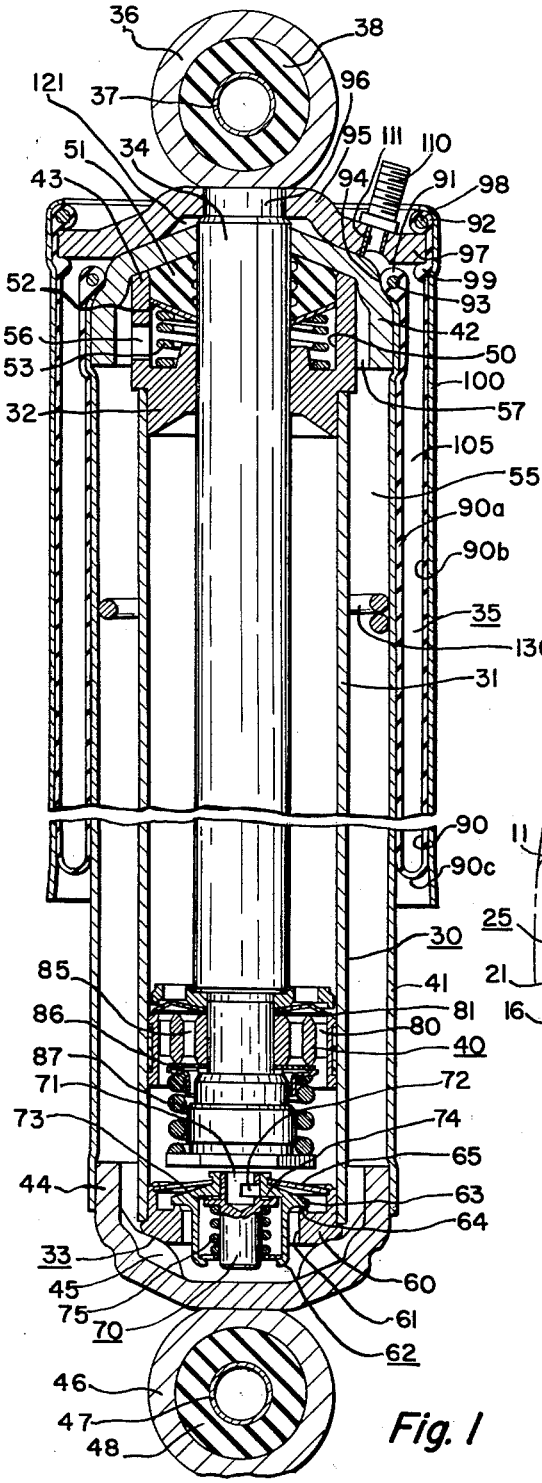
FIGURE 1 is a longitudinal cross-sectional view of the auxiliary unit of this invention comprising a shock absorber and an air spring.

The shock absorber 30 consists of a cylinder tube 31 closed at one end by a rod guide member 32 and at the opposite end by a base valve member 33. The rod guide 32 receives a rod 34 that extends exteriorly of the shock absorber and carries the mounting ring 36 that in turn supports a support member 37 by means of a rubber sleeve 38, the support member 37 providing the attachment fitting 26 for attaching the one end of the shock absorber to the chassis frame 15. The rod 34 carries a shock absorber piston 40 within the cylinder sleeve 31 for reciprocation therein. The cylinder sleeve 31 is positioned coaxially within a reservoir tube 41 that has a cap member 42 welded to one end thereof, this cap member 42 seating upon the upper end 43 of the rod guide member 32, as shown in FIG. 1. The opposite end of the reservoir tube 41 is closed by a cap member 44 having a plurality of inwardly extending ribs 45 on which the base valve member 33 seats whereby the cylinder tube 31 is retained between the cap members 42 and 44, the member 44 being welded to the tube 41 in conventional manner. The cap member 44 carries a mounting ring 46 that in turn supports a support member 47 carried by a rubber sleeve 48, the member 47 providing the means by which the lower end of the shock absorber and air spring assembly is attached to the bracket 28 of the unsprung assembly 12 of the vehicle.

The rod guide member 32 has an annular recess forming a seal chamber 50 in which a rubber-like resilient seal member 51 is confined between the cap member 42 and a retaining washer 52 by means of a compression spring 53. The seal chamber 50 communicates with the reservoir chamber 55 between the reservoir tube 41 and the cylinder tube 31 by means of the port 56 and the passage 57.

The base valve 33 consists of a seat member 60 having an axial bore 61 that receives a valve member 62 having the annular flange 63 supported on the valve seat 64, a finger spring 65 lightly retaining the valve 62 on the seat 64. The valve member 62 has an internal axially positioned valve 70 provided with an axial opening 71 and a radially extending opening 72, the valve 70 having an annular flange portion 73 engaging the valve seat 74 as held thereon by the compression spring 75. The valve member 70 resists flow of hydraulic fluid into the reservoir chamber 55 from beneath the piston 40 on downward movement of the piston toward the base valve 33 as controlled by the spring 75, while the valve member 62 provides for substantial free flow of hydraulic fluid from the reservoir chamber 55 into the area beneath the piston 40 on upward movement of the piston 40 away from the base valve 33.

The shock absorber piston 40 has one series of circumferentially positioned passages 80 closed by the valve member 81 to prevent flow of hydraulic fluid from the chamber above the piston 40 into the chamber below the piston on movement of the piston away from the base valve 33, and to allow fluid flow on opposite direction of movement of the piston between these chambers under control of the action of the valve 81.

Similarly, the piston 40 is also provided with a second circumferentially arranged series of passages 85 closed by a valve member 86 under control of a compression spring 87 by which fluid under pressure is allowed to flow from the chamber above the piston 40 into the chamber below the piston 40 when the pressure in the upper chamber equals the resistance of the spring 87.

The action of the shock absorber of the auxiliary units 25 is the same as any direct acting shock absorber placed between the sprung mass and the unsprung mass of a vehicle. On compression stroke of the shock absorber, that is on movement of the sprung mass 15 toward the unsprung mass 12 of the vehicle, the shock absorber resists this movement by compression of the hydraulic fluid in the cylinder chamber between the piston 40 and the base valve 33, a part of the fluid passing through the valve 81 into the cylinder chamber above the piston and the remaining fluid passing through the valve 70 under the control of the compression spring 75 for flow into the reservoir chamber 55. On rebound stroke of the shock absorber, that is on movement of the sprung mass 15 away from the unsprung mass 12, hydraulic fluid in the cylinder chamber above the piston 40 is forced to flow into the cylinder chamber below the piston under control of the action of the valve 86 and the compression spring 87, additional fluid required to fill the chamber beneath the piston 40 being received from the reservoir chamber 55 through opening of the valve 62.

While one particular internal construction of the shock absorber has been illustrated and described herein, it will be apparent to those skilled in the art that various types of tubular direct acting shock absorbers can be incorporated in this invention without departing from the scope of the invention.

The shock absorber of this invention incorporates the air spring 35 that is under manual control of the operator of the vehicle to render the air spring either active or inactive and thereby render it effective or ineffective in adding its spring support to that of the main spring of the vehicle.

The air spring 35 consists of a resiliently flexible tubular fluid retaining wall means 90 that has an inner wall portion 90a and an outer wall portion 90b connected by a U-shaped wall portion 90c, thereby placing the free ends 91 and 92 respectively at the same end of the tubular wall structure, as illustrated in FIG. 1. The double walled tubular wall structure 90 has the end 91 thereof of the inner wall portion 90a engaging the cap member 42 of the reservoir tube and supported thereon by means of the enlarged cross-sectional area of the end 91 having a rigid ring member 93 molded within the end 91 to prevent the end from moving downwardly over the reservoir tube when positioned on the end cap 42 in the recessed area 94 thereof.

The opposite end 92 of the tubular structure 90 engages a flange member 95 secured on the rod 34 in the recessed area 96 thereof, the joint between the member 95 and the rod 34 being a fluid type joint for reasons hereinafter apparent. The flange member 95 extends generally radially of the rod 34 and supports the end 92 of the outer wall portion 90b on the peripheral portion 97 of the flange member 95. The wall portion 90b has the rigid ring 98 in the end portion 92 that engages the peripheral portion 97 of the flange 95 on the upper side thereof and has an enlarged portion 99 engaging the flange on the under side thereof whereby to hold the wall portion 90b in position on the flange member 95.

To further retain the end portion 92 of the tubular wall structure 90 on the flange 95, a tubular member 100 is placed over the end portion 92 and holds the end portions 98 and 99 in engagement with the flange portion 95.

The tubular member 100 extends downwardly around the reservoir tube of the shock absorber and encloses at least a part of the length of the tube, as shown in FIG. 1. When the shock absorber is completely compressed, as shown in FIG. 1, the U-shaped portion 90c of the wall structure 90 is still retained within the space provided between the tubular member 100 and the reservoir tube 41. The arrangement is such therefore that during the full and complete stroke of reciprocation of the tubular member 100 relative to the reservoir tube 41 in normal operation of the shock absorber, the diaphragm wall structure consisting of the walls 90a and 90b will be fully supported by the reservoir tube 41 and the tubular member 100, the wall portion 90a being supported by the reservoir tube and the wall portion 90b being suppotred by the tubular member 100. Therefore, the diaphragm wall structure can be of relatively light weight cross section with sufficient strength just to support the air pressure that will be applied into the air chamber or fluid chamber 105 under control of the operator of the vehicle in the manner hereinafter defined.

The flange member 95 carries a fitting member 110 placed in a port opening 111 in the flange 95 so that fluid under pressure can be supplied into the chamber space 105. The fittings 110 of the shock absorber assemblies are connected by the conduit 112 with a source of air or other gas under pressure 113 and a manually controlled valve 115 that is under control of the operator of the vehicle. The gas pressure source 113 may be an air pressure bottle or a compressor driven by the engine of the vehicle, as desired.

The flange member 95 together with the end cap 42 of the shock absorber form one end of the wall of the gas chamber 105, the flexible wall structure 90 forming the remaining part of the air or gas chamber. As will be seen from the drawing, the shock absorber rod seal 51 is enclosed within the cavity formed by the chamber space 105 so that the rod seal is constantly under the effect of the air pressure or gas pressure in the chamber 105 in the air spring. The rod seal 51 is engineered and designed to be primarily effective against loss of hydraulic fluid from the reservoir chamber 55 and from the high-pressure hydraulic fluid produced in a cylinder chamber 31 between the piston 40 and the rod guide 32 of the shock absorber. The rod seal 51 is somewhat less effective against sealing of high-pressure gaseous fluids from the exterior side of the shock absorber so that with the rod seal end of the shock absorber being enclosed within the chamber space 121 and thereby submitted to the effect of the gas under pressure in the chamber 105 of the air spring, the gaseous pressure in the air chamber 105 will seep into the upper end of the reservoir chamber 55 of the shock absorber through the rod seal 51 and increase the pressure in the reservoir chamber 55 to substantially above atmosphere. This increase in pressure in the reservoir chamber 55 tends to supercharge the hydraulic fluid in the reservoir chamber and obtain thereby more consistent operation of the shock absorber and to reduce frothing of the oil in the reservoir chamber as a result of the higher gaseous pressure existent in the reservoir chamber 55. The tendency of the gas under pressure is to seep into the chamber 55 rather than exhaust from it because of the more effective sealing of the seal member 51 against loss of hydraulic fluid in a direction of outflow from the hydraulic fluid rather than in a direction of inflow from the outside of the shock absorber. Thus the gaseous pressure tends to remain within the reservoir chamber 55 of the shock absorber.

A baffle ring 130 is provided in the reservoir chamber tending to reduce frothing of the oil in the reservoir chamber.

In normal practice shock absorbers that are to be used with a particular automotive vehicle are calibrated with respect to the main suspension springs in a manner to provide, in cooperation with the main suspension springs, a desired ride effect on the vehicle. The shock absorber valving is calibrated so that the shock absorbers will effectively dampen the rebound of the main springs and so that they will have sufficient compression resistance to eliminate wheel hop while at the same time, the resistance is not excessive so as to impair a soft comfortable ride in the vehicle. At the same time, the main springs for the vehicle are engineered as a compromise between the suspension necessary to support a minimum load and that required to support a maximum load of the vehicle in a manner that a minimum load will be supported without undue ride harshness and at the same time the maximum load expected to be carried by the vehicle under normal conditions will be sufficiently supported. Then under normal circumstances the body of the vehicle will not ride on the bump stops provided between the chassis and the axle of the vehicle. These normal engineering practices need not be changed to adapt the auxiliary unit 25 to a vehicle that has had the spring suspension system and shock absorber engineered in the normal manner. This is because under normal circumstances the shock absorber 30 of the auxiliary unit 25 can be engineered in the same manner as the normal shock absorber conventionally used on a vehicle, the air chamber 105 of the air spring 35 being normally maintained at a pressure just slightly above atmosphere when the shock absorber is fully extended so that the walls of the air spring unit will not rub one upon the other, that is the air spring unit will not collapse. An internal pressure on the value of 10 to 15 pounds per square inch is sufficient for this purpose when the shock absorber and the air spring unit are at normal static trim height for the vehicle. This low value air pressure within the air chamber 105 will not substantially change the normal spring suspension effect of the main springs of the vehicle as engineered by the automotive manufacturer, and therefore will not substantially change the ride effect normally built into a vehicle by the manufacturer. The shock absorber 30 will have substantially the same characteristics as the normal shock absorber originally placed on the vehicle as manufactured so that the damping effect of the shock absorber will be substantially the same as though the air spring 35 was not carried on the shock absorber.

With a normal one to five passenger car load in the vehicle on which the auxiliary units of this invention are applied, the minimum air pressure heretofore mentioned is sufficient within the chamber 105 of the air spring 35, the vehicle normally being engineered to carry such a passenger load, without adverse effect of excessive engagement of the bump stops on the vehicle.

However, when large baggage loads are carried in the trunk of a passenger vehicle or on the deck of a station wagon, or when a boat trailer is attached to the rear of a passenger vehicle or station wagon, an above normal dead weight load is carried at the rear end of the vehicle. This abnormal load causes excessive engagement of the bump stops on the vehicle, and causes elevation of the headlight beam at night which results in dangerous driving conditions.

When above normal loads are carried by a vehicle, the operator of the vehicle can open the valve 115 to allow air or other gas under pressure to be supplied from the source 113 into the air chambers 105 of the air springs 35 so that the air pressure within the air chambers 105 provides additional support or resistance for and with the main springs 20 of the vehicle to support the above normal load in or on the vehicle. For example, a pressure of 60 p.s.i. in the air chambers 105 will compensate for about an additional 200 pounds per wheel with the auxiliary units 25 at static trim height. The operator of the vehicle can readily determine the normal level condition of the vehicle by the angle of his headlight beams.

As shown in FIG. 3, the valve 115 is shown in a closed position to prevent either fluid pressure flow to the air springs 35 or exhaust of air pressure from the air springs. When the operator desires to supply air to the air springs, the rotary element 115a of the valve 115 is rotated so that its passage 115b connects the conduit portion 114a with the conduit portion 114b. When the air pressure rises in the air springs to the desired value, the operator can then return the valve to the closed position shown in FIG. 3.

When the excessive load or abnormal load is removed from the vehicle, the air pressure previously added to the air springs 35 should be dropped to the minimum low value previously mentioned herein to render the air springs substantially ineffective and return the vehicle to full suspension on the main springs only. This is accomplished by rotation of the member 115a of the valve 115 to connect the conduit portion 114b with an exhaust conduit 114c to allow the air pressure to exhaust from the air springs, the operator then returning the valve to the off position shown in FIG. 3 to maintain a minimum aforementioned pressure in the air springs to prevent their collapse on full extension of the shock absorber on a rebound stroke.

While the embodiment of the present invention as herein disclosed, constitutes a preferred form, it is to be understood that other forms might be adopted.

What is claimed is as follows:

1. A hydraulic direct acting shock absorber, including, a cylinder tube having a piston therein attached at one end of a piston rod, said rod extending exteriorly of the shock absorber through a seal chamber containing a rod seal member at one end of said cylinder tube, a reservoir tube surrounding said cylinder tube and having an end closure member closing the same and also closing the exteriorly positioned end of said seal chamber and through which said rod extends exteriorly of the shock absorber for mounting attachment to a device, a second tubular member surrounding a part of said reservoir tube in spaced relation thereto forming a space therebetween and including an end closure cap portion secured to said rod, said second tubular member being reciprocable relative to said reservoir tube on relative reciprocation between said rod and said reservoir tube, a resiliently flexible tubular fluid retaining wall means having inner and outer wall portions spaced in coaxially disposed arrangement connected by a U-shaped portion formed from the inner or the outer wall portions on relative axial movement therebetween with the free ends of the respective inner and outer wall portions disposed toward the same end of said flexible tubular wall means, said flexible tubular wall means surrounding a part of said reservoir tube and positioned in the said space between said reservoir tube and said second tubular member in supported rolling engagement on the exterior periphery of said reservoir tube and the inner periphery of said second tubular member, means effecting sealing engagement of the free end of said inner wall portion on the periphery of said reservoir tube, means effecting sealing engagement of said outer wall portion with the inner periphery of said second tubular member whereby reciprocation between said reservoir tube and said second tubular member effects reciprocation between the said inner and outer wall portions of said tubular wall means, said flexible tubular wall means cooperating with said reservoir tube end closure member and said second tubular member end closure cap to form therewith a closed fluid receiving chamber with the said U-shaped portion of said tubular wall means providing for closure of the said space between said reservoir tube and said second tubular member during reciprocal telescopic movement therebetween, said means in said second tubular member providing port means for admission or exhaust of fluid relative to said closed chamber.

2. A hydraulic direct acting shock absorber constructed and arranged in accordance with claim 1 wherein the said inner and outer wall portions are supported solely by the said reservoir tube and the said second tubular member respectively during reciprocation therebetween.

3. A hydraulic direct acting shock absorber constructed and arranged in accordance with claim 1 wherein the end of the reservoir tube through which the said rod extends to the exterior of the shock absorber is confined within the space between the reservoir tube and said second tubular member and thereby exposed to fluid pressure in the said space whereby differential of fluid pressure between the said space and the interior of said reservoir tube results in movement of fluid pressure from the said space into the said reservoir tube to apply fluid pressure on the hydraulic fluid in the said reservoir tube.

4. A hydraulic direct-acting tubular shock absorber and air assist spring, comprising, relatively movable telescoping parts including a reservoir tube having end closure wall means closing each of opposite ends thereof as one of said parts enclosing a cylinder radially spaced from the reservoir tube providing thereby a reservoir space therebetween and having a piston in the cylinder connected to one end of a rod member projecting through one of said reservoir tube end closure wall means as the other of said parts, a second tubular member having an end closure wall sealingly engaging said rod and surrounding at least a part of said reservoir tube in spaced relation thereto forming a space therebetween, a resiliently flexible tubular fluid retaining wall means surrounding a part of said reservoir tube in the said space having one axially extending portion supported fully on the exterior periphery of said reservoir tube and having a second axially extending portion supported fully on the inner periphery of said second tubular member, one of the ends of said flexible wall means sealingly engaging said reservoir tube at the rod receiving end thereof, the other of the ends of said flexible wall means sealingly engaging said second tubular member at the rod engaging end thereof, said flexible wall means cooperating with the rod receiving end of said reservoir tube and with the rod engaging end of said second tubular member to form therewith a closed fluid receiving chamber with said flexible wall means in rolling engagement with the exterior periphery of said reservoir tube and the inner periphery of said second tubular member providing for reciprocable telescoping movement of said telescoping parts, and means in one of said telescoping parts providing port means for admission or exhaust of fluid relative to said closed chamber.

References Cited in the file of this patent

UNITED STATES PATENTS 2,916,296    Muller _____ Dec. 8, 1959

FOREIGN PATENTS 214,922    Australia _____ May 2, 1958
218,802    Australia _____ Nov. 21, 1958